June 6, 1933.                H. C. DRAKE                1,912,570
                         METHOD OF FLAW DETECTION
                           Filed Oct. 27, 1930

INVENTOR
Harcourt C. Drake
BY
                    Joseph H. Lipschutz
                        ATTORNEY Patented June 6, 1933

1,912,570

UNITED STATES PATENT OFFICE

HARCOURT C. DRAKE, OF HEMPSTEAD, NEW YORK, ASSIGNOR TO SPERRY PRODUCTS, INC., OF BROOKLYN, NEW YORK, A CORPORATION OF NEW YORK

METHOD OF FLAW DETECTION

Application filed October 27, 1930. Serial No. 491,469.

This invention relates to means for detecting flaws in electrical conductors. More particularly it relates to that system of flaw detection wherein electric current is passed through the conductor to establish an electromagnetic field around the same, which is displaced by flaws encountered within the electric conductor and which tend to displace the axis of the current. Such displacement is detected by means, such as opposed induction coils moving through said field, to actuate a suitable indicator. Such a system is disclosed in Reissue 18,555, August 2, 1932, to Elmer A. Sperry.

It has been found that under certain conditions variations in magnetic flux with consequent displacement of the electromagnetic field will be caused by hard spots, stresses in the material, and difference in crystalline structure, none of which are defects of a type which can cause the conductor to fail in operation. An indication of a flaw will thus be obtained when none in fact exists. It is the principal object of my invention to provide a method of operation which will distinguish between such conditions of internal structure as will not cause failure or breaking in service, and those defects, such as fissures, which actually cause the material to fail in service.

Further objects and advantages of this invention will become apparent in the following detailed description thereof.

In the accompanying drawing.

Figure 1:
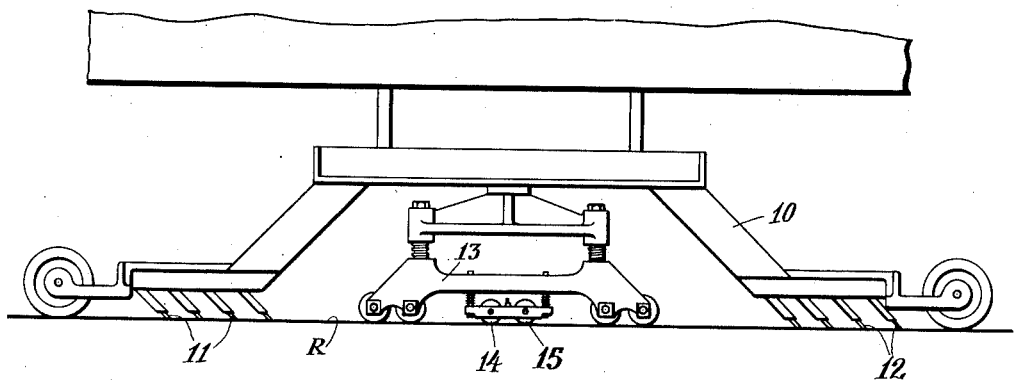
Fig. 1 is a side elevation of a portion of a rail flaw detecting carriage supported on a car-body.

Referring to Fig. 1 of the drawing, there is shown the main supporting carriage 10, brushes 11, 12 for leading the current into and out of the conductor R, a pick-up unit 13, comprising two opposed inductance coils 14, 15 which successively cut the electro-magnetic field surrounding the conductor, so that one of these coils strikes a displacement in the electro-magnetic field before the other to cause a differential E. M. F.

Figure 2:
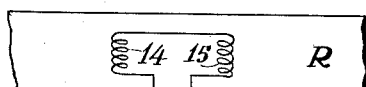
Fig. 2 is a wiring diagram illustrating one method whereby flaws are caused to operate an indicator.

Fig. 2 discloses how the two coils are balanced one against the other, so that normally there is no differential E. M. F. The coils are shown as leading to an amplifier which may be of any well known design, such as a resistance-coupled amplifying circuit. The output from the amplifier is caused to operate a pen P through the medium of a circuit closer, comprising magnet 20 and contacts 21, which closes the circuit through a pen-operating magnet 22. The pen is then caused to indicate upon a moving chart C. In this instance I have shown the conductor as a rail and the flaw detecting device as the type adapted to operate along a rail.

Figure 3:
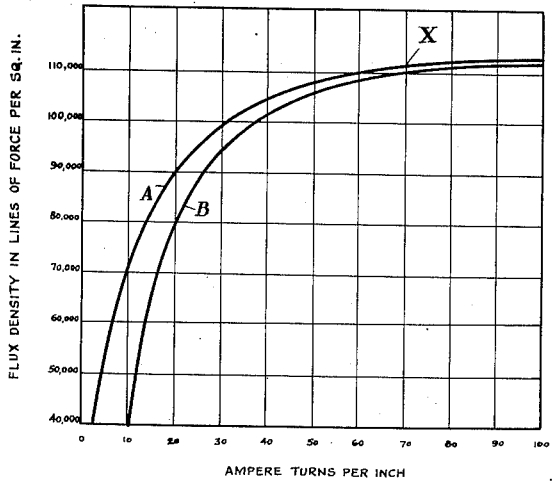
Fig. 3 is a graph which illustrates the principle embodied in my invention.

The theory of my invention is well illustrated in Fig. 3, wherein it is shown that for two magnetic materials A and B, differing in internal structure, the magnetic flux or lines of force through the conductor varies widely for a given number of ampere-turns, up to a certain critical point X, beyond which the magnetic flux in the two materials is substantially the same. For example, with 10 ampere-turns, material A has 70,000 while B has 40,000 lines of force therethrough. With 70 ampere-turns, however, both materials have substantially the same number of lines therethrough, i. e., 110,000. The point X is known as the saturation point. Since the invention is here illustrated in connection with a rail as an electrical conductor, the number of turns is one and therefore the number of ampere-turns is the same as the number of amperes.

It has been found that in that region leading up to the saturation point such variations in internal structure in the conductor as hard spots, stresses in the material, and differences in crystalline structure, permit a different number of lines of force to pass therethrough than the rest of the conductor, therefore displacing the electro-magnetic field surrounding the conductor and operating the indicating mechanism hereinbefore described. Such variations in internal structure would therefore show up as flaws in the material. However, such variations in internal structure are not the type of flaws which such mechanism is designed to discover, because such variations in internal structure do not result in complete failure of the conductor in use. That is to say, in the particular application which I have described, such variations in internal structure of the rail would not cause breaking of the rail. It is desirable, therefore, to provide some means whereby such variations in internal structure which do not result in failure or breaking of the conductor in use should not affect the flaw indicating mechanism.

Figure 4:
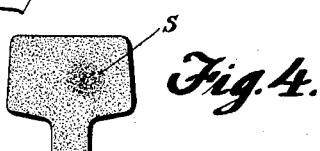
Fig. 4 is a section through a rail head, showing a variation in internal structure which it is not desired to indicate.
Figure 5:
Fig. 5 is a view similar to Fig. 4, but showing a fissure which it is desired to indicate.

I have made use of the hereinbefore described principle in order to effect the hereinbefore described desirable result. This principle consists in utilizing that portion of the curve of Fig. 3 beyond (to the right of, in this figure) the saturation point X, because by completely saturating the conductor with magnetic flux such variations in internal structure as have been hereinbefore mentioned, that is to say, hard spots, stresses in the material, and differences in crystalline structure, have substantially the same magnetic flux or lines of force therethrough as the remainder of the conductor and hence do not displace the electro-magnetic field surrounding the conductor. When the conductor is so saturated with magnetic flux, a fissure will, however, prevent the passage of current through the split or cracked portion and hence will displace the current axis and the electro-magnetic field. By utilizing a current of sufficient amperage to saturate the given conductor completely with magnetic flux, I thereby obtain the desirable result that variations in the internal structure like the hard spot S shown in Fig. 4, which will not cause breaking or failure of the conductor, are not transmitted to the indicator, while defects such as fissures F, as shown in Fig. 5, which will cause the conductor to break or fail, will affect the indicating device.

In accordance with the provisions of the patent statutes, I have herein described the principle and operation of my inventon, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A method of detecting flaws in electric conductors, which consists in passing sufficient current through the conductor so that only fissures will cause displacement of the electro-magnetic field, and cutting with inductive means the electro-magnetic field surrounding the conductor to detect displacement of said field.

2. A method of detecting flaws in electrical conductors which consists in passing sufficient current through the conductor to saturate the same with flux and cutting with inductive means the electro-magnetic field surrounding the conductor to detect displacement of said field.

3. A method of detecting flaws in electrical conductors which consists in passing sufficient current through the conductor substantially to saturate the same with flux, and cutting with inductive means the electro-magnetic field surrounding the conductor to detect displacement of said field.

In testimony whereof I affix my signature.

HARCOURT C. DRAKE.